United States Patent
Hombs et al.

(10) Patent No.: US 9,780,970 B2
(45) Date of Patent: Oct. 3, 2017

(54) METHODS, SYSTEMS, AND COMPUTER PROGRAM PRODUCTS FOR ADAPTIVE CHANNEL ESTIMATION AND EQUALIZATION IN A MULTICARRIER COMMUNICATION SYSTEM

(71) Applicant: Collision Communications, Inc., Peterborough, NH (US)

(72) Inventors: Brandon Hombs, Merrimack, NH (US); Sayak Bose, Nashua, NH (US)

(73) Assignee: COLLISION COMMUNICATIONS, INC., Peterborough, NH (US)

( * ) Notice: Subject to any disclaimer, the term of this patent is extended or adjusted under 35 U.S.C. 154(b) by 371 days.

(21) Appl. No.: 14/552,679

(22) Filed: Nov. 25, 2014

(65) Prior Publication Data
US 2016/0149726 A1     May 26, 2016

(51) Int. Cl.
*H04L 27/26*     (2006.01)
*H04L 27/01*     (2006.01)
*H04L 25/02*     (2006.01)

(52) U.S. Cl.
CPC ...... *H04L 25/0202* (2013.01); *H04L 27/2601* (2013.01); *H04L 27/2647* (2013.01)

(58) Field of Classification Search
CPC ............. H04L 25/0202; H04L 27/2601; H04L 27/2647
See application file for complete search history.

(56) References Cited

U.S. PATENT DOCUMENTS

| | | | |
|---|---|---|---|
| 2009/0060102 A1* | 3/2009 | Wong ..................... | H03G 3/001 375/345 |
| 2009/0141819 A1* | 6/2009 | Hojen-Sorensen . | H04L 27/2647 375/260 |
| 2013/0022097 A1* | 1/2013 | Hewavithana ........ | H04L 25/022 375/232 |

* cited by examiner

*Primary Examiner* — Melvin Marcelo (57) ABSTRACT

Methods and systems are described for adaptive channel estimation and equalization in a multicarrier communication system. In one aspect, a channel estimation in a multicarrier communication system is determined. A prediction error is determined based on a difference between the channel estimation and a reference signal. An equalization matrix is formed based on the prediction error.

26 Claims, 5 Drawing Sheets

METHODS, SYSTEMS, AND COMPUTER PROGRAM PRODUCTS FOR ADAPTIVE CHANNEL ESTIMATION AND EQUALIZATION IN A MULTICARRIER COMMUNICATION SYSTEM

BACKGROUND

Modern broadband wireless communication systems use multicarrier and multi antenna systems to increase system throughput. Single or multicarrier orthogonal frequency division multiple access (OFDMA) techniques have been adopted as various wireless communications standards, such as Long Term Evolution (LTE), Wi-Fi, and WiMAX, to name a few. Wideband Code Division Multiple Access (WCDMA), which has been adopted as the broadband standard for most existing wireless communication infrastructures today, also provides multiuser gains by using orthogonal codes for multiple simultaneous users in time domain. Standards employing OFDMA have advantages over traditional access technologies, such as TDMA and FDMA, in terms of scalability and multiuser gains.

Performing effective channel estimation in the presence of variable multiple access interference and multipaths, and subsequent equalization is important for data recovery at the receiver. Several channel estimation algorithms have been proposed that have the ability to estimate the channel in time/frequency domain adaptively. Recursive least square (RLS), least mean square (LMS), and Kalman filter (KF) based frequency domain channel estimation have been a few promising approaches in this respect. In RLS or LMS, channel estimation is carried out per time sample/frequency, usually based on a forgetting factor that adaptively controls the number of previous time sample/carrier contributions to the current channel estimate. In a Kalman filter based channel estimation process, a state space model of the channel is used to adaptively estimate and track the channel. These approaches have been shown to provide similar or significant performance improvement over the conventional block and static channel estimation algorithms, usually with the added advantage of having lower implementation complexities. Similarly, many low complexity linear equalization algorithms, including minimum mean square error (MMSE), zero forcing (ZF), and interference rejection combining (IRC), have been proposed for equalization of multiple access systems that require the estimated channel information to compute the equalization and spatial beamforming matrix.

In a wireless communication system, single or multiple data streams are multiplexed in time, frequency, or both, and space (antenna) and sent over the air using an efficient transmission scheme to increase system throughput, especially in a bandwidth limited scenario. In this process, the information bits in each data stream are separately channel coded, interleaved, and modulated to generate transmission symbol sequences, where each symbol sequence is taken from a pre-determined M-ary modulation set, where M represents the number of modulation symbols in the set. In addition to the data symbols, typically, additional known symbols are sent to facilitate coherent channel estimation at the receiver. The channel estimation can be performed per time sample/carrier, and/or jointly over all the data streams, or per a set of time sample/carriers and/or jointly over all the data streams. After channel estimation is performed, an equalization matrix is formed based on an MMSE, IRC or ZF criteria per stream or jointly over all the streams per time/frequency and is used to invert the effect of the channel on the received symbols. The equalized received symbols per data stream are then passed on to a demodulator to generate soft channel bits. These are then passed on to the channel de-interleaver and subsequently to the channel decoder to recover the information bits.

Using conventional methods, formation of the space-frequency equalization matrix requires matrix inversion, which introduces extra overhead in terms of complex multiplications and additions and numerical errors. This extra overhead can prohibit an efficient hardware implementation, especially in a rank deficient scenario that uses fewer observations than the number of received streams. This problem is typical for any multiple access wireless communication multiple access systems employing single or multiple streams.

Accordingly, there exists a need for methods, systems, and computer program products for adaptive channel estimation and equalization in a multicarrier communication system.

SUMMARY

Methods and systems are described for adaptive channel estimation and equalization in a multicarrier communication system. In one aspect, a channel estimation in a multicarrier communication system is determined. A prediction error is determined based on a difference between the channel estimation and a reference signal. An equalization matrix is formed based on the prediction error.

BRIEF DESCRIPTION OF THE DRAWINGS

Advantages of the claimed invention will become apparent to those skilled in the art upon reading this description in conjunction with the accompanying drawings, in which like reference numerals have been used to designate like or analogous elements, and in which:

DETAILED DESCRIPTION

Figure 1:
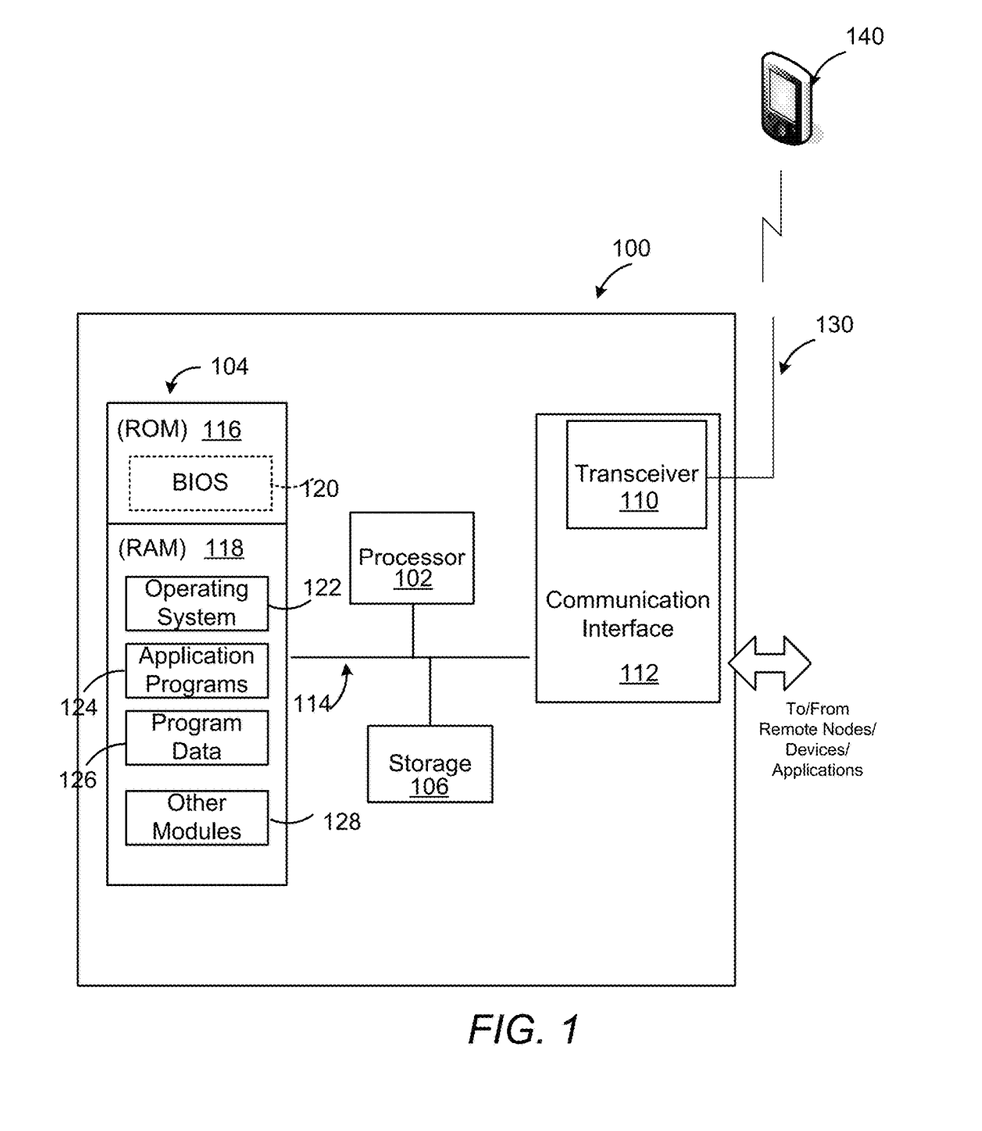
FIG. 1 is a block diagram illustrating an exemplary hardware device in which the subject matter may be implemented.

Prior to describing the subject matter in detail, an exemplary hardware device in which the subject matter may be implemented shall first be described. Those of ordinary skill in the art will appreciate that the elements illustrated in FIG.

1 may vary depending on the system implementation. With reference to FIG. 1, an exemplary system for implementing the subject matter disclosed herein includes a hardware device 100, including a processing unit 102, memory 104, storage 106, transceiver 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100. It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128.

The hardware device 100 may be part of a base station (not shown) configured to communicate with mobile devices 140 in a communication network. A base station may also be referred to as an eNodeB, an access point, and the like. A base station typically provides communication coverage for a particular geographic area. A base station and/or base station subsystem may cover a particular geographic coverage area referred to by the term "cell." A network controller (not shown) may be communicatively connected to base stations and provide coordination and control for the base stations. Multiple base stations may communicate with one another, e.g., directly or indirectly via a wireless backhaul or wireline backhaul.

The hardware device 100 may operate in a networked environment using logical connections to one or more remote nodes via communication interface 112, including communicating with one or more mobile devices 140 via a transceiver 110 connected to an antenna 130. The mobile devices 140 can be dispersed throughout the network 100. A mobile device may be referred to as user equipment (UE), a terminal, a mobile station, a subscriber unit, or the like. A mobile device may be a cellular phone, a personal digital assistant (PDA), a wireless modem, a wireless communication device, a handheld device, a laptop computer, a wireless local loop (WLL) station, a tablet computer, or the like. A mobile device may communicate with a base station directly, or indirectly via other network equipment such as, but not limited to, a pico eNodeB, a femto eNodeB, a relay, or the like.

The remote node may be a computer, a server, a router, a peer device or other common network node, and typically includes many or all of the elements described above relative to the hardware device 100. The communication interface 112, including transceiver 110 may interface with a wireless network and/or a wired network. For example, wireless communications networks can include, but are not limited to, Code Division Multiple Access (CDMA), Time Division Multiple Access (TDMA), Frequency Division Multiple Access (FDMA), Orthogonal Frequency Division Multiple Access (OFDMA), and Single-Carrier Frequency Division Multiple Access (SC-FDMA). A CDMA network may implement a radio technology such as Universal Terrestrial Radio Access (UTRA), Telecommunications Industry Association's (TIA's) CDMA2000®, and the like. The UTRA technology includes Wideband CDMA (WCDMA), and other variants of CDMA. The CDMA2000® technology includes the IS-2000, IS-95, and IS-856 standards from The Electronics Industry Alliance (EIA), and TIA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advance (LTE-A) are newer releases of the UMTS that use E-UTRA. UTRA, E-UTRA, UMTS, LTE, LTE-A, and GAM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies.

Other examples of wireless networks include, for example, a BLUETOOTH network, a wireless personal area network, and a wireless 802.11 local area network (LAN). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 2:
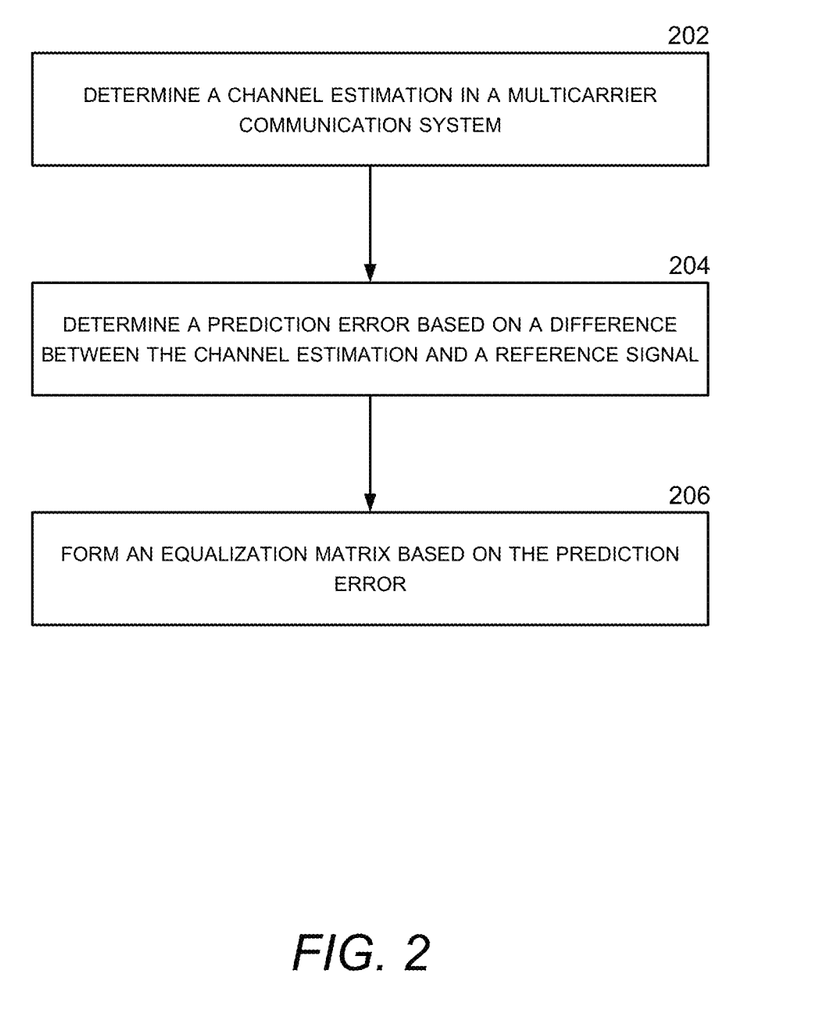
FIG. 2 is a flow diagram illustrating a method for adaptive channel estimation and equalization in a multicarrier communication system according to an aspect of the subject matter described herein.
Figure 3:
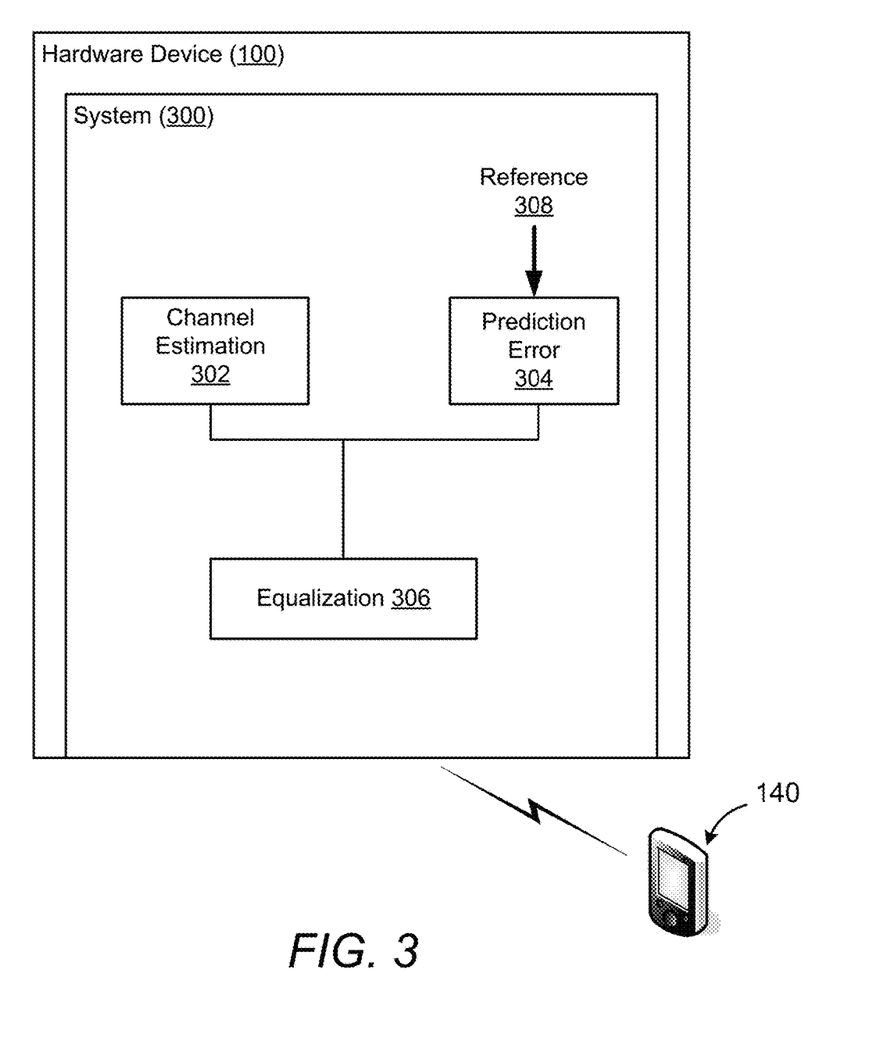
FIG. 3 is a block diagram illustrating an arrangement of components for adaptive channel estimation and equalization in a multicarrier communication system according to another aspect of the subject matter described herein.

Turning now to FIG. 2, a flow diagram is shown illustrating a method for adaptive channel estimation and equalization in a multicarrier communication system according to an exemplary aspect of the subject matter described herein. FIG. 3 is a block diagram illustrating an arrangement of components for adaptive channel estimation and equalization in a multicarrier communication system according to another exemplary aspect of the subject matter described herein. FIG. 1 is a block diagram illustrating an arrangement of components providing an execution environment configured for hosting the arrangement of components depicted in FIG. 3. The method in FIG. 2 can be carried out by, for example, some or all of the components illustrated in the exemplary arrangement 300 in FIG. 3 operating in a compatible execution environment, such as the environment provided by some or all of the components of the arrangement in FIG. 1. That is, the arrangement of components in FIG. 3 may be implemented by some or all of the components of the hardware device 100 of FIG. 1.

With reference to FIG. 2, in block 202 a channel estimation is determined in a multicarrier communication system. Accordingly, a system for adaptive channel estimation and equalization in a multicarrier communication system includes means for determining a channel estimation in a multicarrier communication system. For example, as illustrated in FIG. 3, a channel estimation component 302 is configured to determine a channel estimation in a multicarrier communication system.

To improve tracking performance, reduce implementation complexity, and better improve numerical behavior, an integrated process can be used where channel estimation and the formation of an equalization matrix are done adaptively per carrier/symbol/time sample or on a set of carriers. Additional benefit is provided if the integrated process does not involve matrix inversion, which as mentioned above, adds substantially to computational overhead. For broadband wireless systems, it may be of additional benefit to perform channel estimation and equalization over a controllable finite memory space to trade-off delay for accuracy. Uplink signal processing in FDD/TDD LTE, WiMAX, Wi-Fi, and WCDMA systems, for example, stand to benefit since multiple access interference and multipath wireless channels have common occurrences. The technology described herein can be integrated into a receiver structure, such as a base station receiver. For ease of description, frequency domain nomenclatures are adopted herein but it will be understood that the methods can be applied in the time domain.

Figure 6:
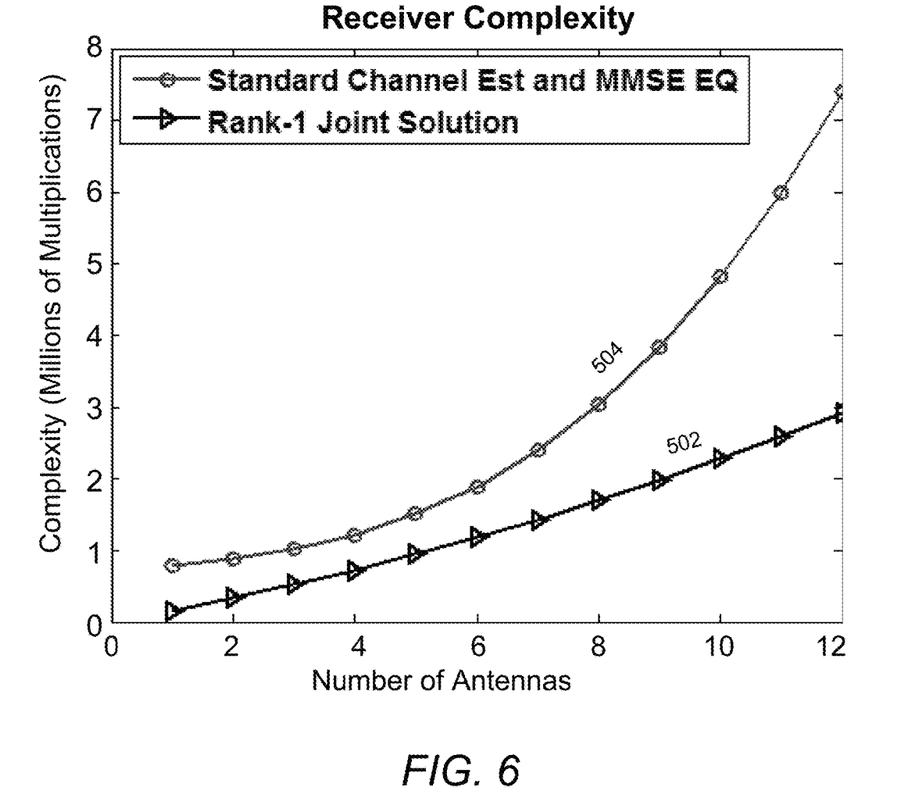
FIG. 6 is a graph that illustrates an exemplary comparison of receiver complexity between conventional techniques involving matrix inversion and techniques using rank-1 updates according to another aspect of the subject matter described herein.

According to an aspect of the subject matter described herein, a relationship between adaptive channel estimation and equalization processes is established so that the equalization matrix can be updated as soon as the current channel estimation process is completed. Updating the equalization matrix can be done in the form of a fixed number of rank-1 and rank-2 updates, both being relatively less complex than a generalized matrix inversion process per carrier, especially for higher dimensional (space, frequency, or number of users) systems. For example, with reference to FIG. 6, a graph is shown that illustrates an exemplary comparison of receiver complexity between conventional techniques involving matrix inversion and techniques using rank-1 updates according to an aspect of the subject matter described herein. The complexity in millions of multiplications required is graphed against the number of antennas. A graph of a conventional receiver architecture employing a generalized matrix inversion process per carrier used in LTE is the plot labeled 502. A graph of a receiver architecture employing techniques using rank-1 updates according to an aspect of the subject matter described herein is shown in plot 504. It is apparent from the graph of FIG. 6, that the use of rank-1 updates provides significantly less complexity than the use of matrix inversion. For example, in a case where there are 12 antennas (assuming 6 users) only roughly 2.8 million multiplication operations are needed for rank-1 updates as compared to roughly 7.5 million multiplication operations being needed for matrix inversion. As communication systems move toward more and more antennas (e.g. Massive MIMO LTE) parts of the standard receiver complexity will continue to grow at a rate proportional to the number of antennas cubed. Employing the techniques described herein that use rank-1 (and rank-2) updates, receiver complexity grows at a much slower rate and the complexity is easily controlled using the parameters described herein.

In one aspect, the channel estimation component 302 can be configured to determine a channel estimation by employing at least one of an RLS technique, an LMS technique, and a KF based frequency domain channel estimation. Finite memory RLS/LMS/KF channel estimation can be realized in practice by employing a window of parameterized length that can be controlled. Channel estimation is adaptively performed in two modes with the help of updating and downdating the window. In an "acquisition mode," the channel estimate is acquired over the first few carriers by minimizing a weighted cost function corresponding to the selected channel estimation algorithm over a properly chosen window length that ensures convergence of the process. At this stage, only updating of the window with channel estimates occurs. Once the channel estimate window is full, the process enters "tracking mode" in which the channel estimates are updated in a "stepwise" manner.

In another aspect, the channel estimation component 302 can be configured to determine a channel estimation by updating a channel estimate in a stepwise manner over a window of adaptable size. The channel estimate is updated in frequency in a stepwise manner in the sense that only one carrier or a set of carriers equal to a predefined stepsize from within the window is updated. The carriers in the middle of the window should preferably be updated to minimize the error between adaptive channel estimates relative to the true channel states.

In another aspect, the channel estimation component 302 can be configured to update a channel estimate stepwise by determining a stepsize based on at least one of a per carrier step size and a per set of carriers step size. Where there is variable number of multiple simultaneous data streams, the window length can be adjusted to account for inclusion or exclusion of channel estimates corresponding to the data stream.

Figure 4:
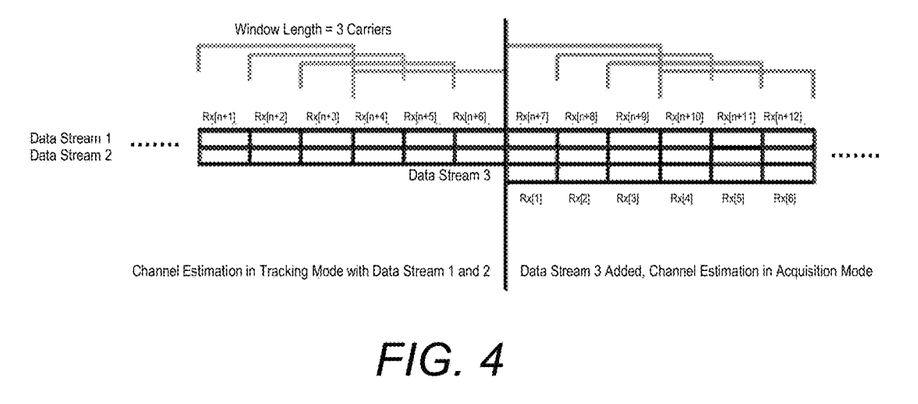
FIG. 4 is a diagram illustrating channel estimation with a sliding window according to another aspect of the subject matter described herein.

FIG. 4 illustrates channel estimation with a sliding window for two data streams (Data Streams 1 and 2) in tracking mode and in acquisition mode with a third data stream (Data Stream 3) added. With reference to FIG. 4, the channel estimation window length is three carriers. When a new multiplexed data stream is received or ends in the middle of a channel estimation window in tracking mode, the window is truncated and the channel estimation process goes back to acquisition mode and re-starts the joint channel estimation process that includes the revised set of received symbols. The channel estimation component 302 can be configured to change a size of the window of adaptable size over a single multicarrier symbol.

Once the channel estimate window is full, the process enters tracking mode. In tracking mode, the channel estimates are updated per carrier or per a set of carriers in a stepwise manner after a predefined stepsize number followed by downdating by the same number of updating operations in the window. During downdating, the least correlated channel estimate (e.g. oldest or farthest in frequency) is removed from the window, and during updating, new data is included in the channel estimate. Therefore, this has the effect of sliding a window over the carriers as channel estimates are produced. Once the window reaches the end of the received symbols, only a number of downdating operations have to be performed to obtain the channel estimates of the last few carriers.

Figure 5:
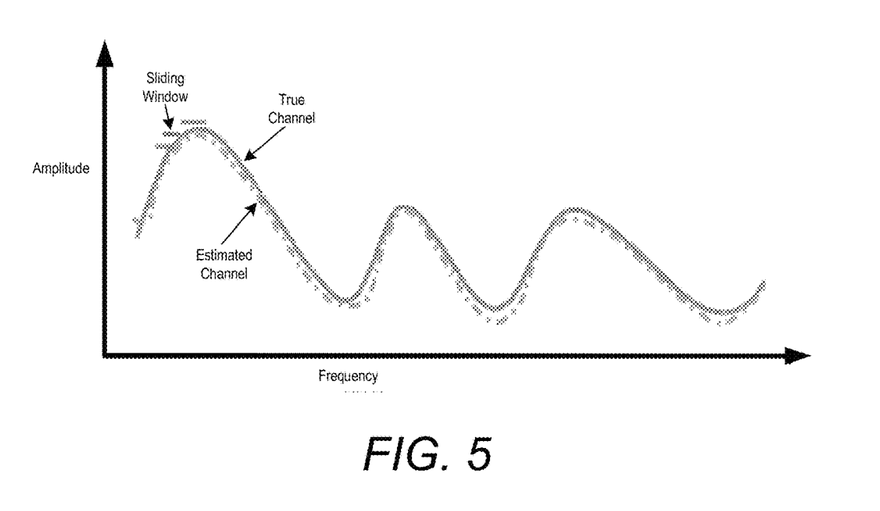
FIG. 5 is diagram that illustrates a scenario where a window size is selected based on the frequency range according to another aspect of the subject matter described herein.

The window size can also be adapted based on the channel conditions such as frequency selectivity coherence bandwidth or coherence time. FIG. 5 illustrates a scenario where a window size is selected based on the frequency range where the channel amplitude remains slowly varying. In an urban environment where the received signals are affected by a large number of multipaths, a shorter window size should be selected for the channel estimation and equalization processes because the channel changes dramatically over small bandwidths. In contrast, in a rural environment where low or no multipath is present in the received signal, a bigger window size can be used for the channel estimation and equalization process. In a vehicular or high speed train environment, where typically a short channel coherence time is expected, channel interpolation can be performed across time and can be seamlessly integrated with the channel estimation and equalization process by properly adjusting the window size.

In another aspect, the size of the window is determined based on at least one of an error vector from a previous channel estimation, channel frequency selectivity estimates, channel time coherency estimates, computational resources available to the receiver, and scheduling information for another user in a multi user system. Typically, a window size corresponding to the expected coherence bandwidth of the received channel can be used to improve channel estimation quality over conventional block based techniques in current multicarrier systems. The quality of the channel estimation and equalization may depend on the initial convergence of the iterative process of channel estimation such that the initial window size is preferably greater than the measured convergence period of the recursive algorithm used for channel estimation. Different window sizes can be used for channel estimation and equalization.

During the downdating and updating operations, error vectors or "innovations" generated as part of the channel estimation process can be used along with channel estimates to adaptively generate and update the equalization matrix using a fixed number of rank-1 or rank-2 updates and downdates. This can follow immediately after the current channel estimate is available.

Returning to FIG. 2, in block 204 a prediction error is determined based on a difference between the channel estimation and a reference signal 308. Accordingly, a system for adaptive channel estimation and equalization in a multicarrier communication system includes means for determining a prediction error based on a difference between the channel estimation and a reference signal 308. For example, as illustrated in FIG. 3, a prediction error component 304 is configured to determine a prediction error based on a difference between the channel estimation and a reference signal 308. The reference signals can be either pilot carriers that are agreed upon by both the transmitter and receiver or they can be detected symbols that are modulated onto a carrier (e.g. decision feedback updates for OFDM). The references used for creating the prediction error in the LTE downlink would be based on the Zadoff-Chu sequences sent during the DMRS transmission.

Returning to FIG. 2, in block 206 an equalization matrix is formed based on the prediction error. Accordingly, a system for adaptive channel estimation and equalization in a multicarrier communication system includes means for forming an equalization matrix based on the prediction error. For example, as illustrated in FIG. 3, an equalization component 306 is configured to form an equalization matrix based on the prediction error. As used herein, the term "formed" is intended to cover creating, modifying, updating, and the like, an equalization matrix.

In one aspect, the equalization component 306 can be configured to form an equalization matrix based on the prediction error by performing, based on the prediction error, rank-1 updates to the equalizer matrix to update the equalizer without direct matrix inversion. The equalization component 306 can be configured to form an equalization matrix by employing an MMSE technique. For example, when the equalization matrix is obtained deterministically over a predefined stepsize number of carriers by minimizing the MSE (MMSE equalization) between the received symbols and the transmitted symbols, the equalization matrix update can be computed using the rank-1 or rank-2 downdate and update processes from error vectors of the corresponding channel estimation process and the current channel estimate.

In another aspect, the equalization component 306 can be configured to form an equalization matrix by at least one of employing a ZF technique, an IRC technique, and a sample matrix inversion (SMI) technique. Instead of computing the covariance matrix directly using the channel estimates, the covariance matrix for the interference can be computed statistically via an SMI. This has the effect of modeling the interference within the covariance matrix resulting in suppression of that interference. Alternatively, the equalization matrix can be obtained in such a manner over a predefined stepsize by forming an interference rejection matrix by averaging the noise plus interference matrix over a window of carriers that is a statistical equivalent of the noise plus interference matrix of the system. In an interference limited scenario, this method of linear equalization is preferred. The update of the equalization matrix can be performed by creating a "pipeline" of the error vectors from the updating processes of channel estimation. The rank-1 or rank-2 updating operations are carried out similarly to the MMSE rank-1 or rank-2 operations described above, while the rank-1 or rank-2 downdating is performed based on the oldest pipelined error vectors of the averaging window. In another aspect, a zero forcing equalization matrix can be adaptively computed based on operations described for the MMSE case.

In another aspect, a second prediction error can be performed based on channel estimates for a subset of all received data streams and, based on the second prediction error, an equalization matrix formed by at least one of employing an MMSE technique, a ZF technique, an IRC technique, and an SMI technique, as described above.

The above-described techniques can be employed in any the multicarrier system, such as an LTE, CDMA, WCDMA, FDD, TDD, Wi-Fi, or WiMAX system. The multicarrier system can be a multi-antenna system or a multi-user single antenna system.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. One of ordinary skill in the art should appreciate after learning the teachings related to the claimed subject matter contained in the foregoing description that variations of those preferred embodiments may become apparent to those of ordinary skill in the art upon reading the foregoing description. The inventor intends that the claimed subject matter may be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method for adaptive channel estimation and equalization in a multicarrier communication system, the method comprising:
   determining a channel estimation in a multicarrier communication system;

determining a prediction error based on a difference between the channel estimation and a reference signal; and forming an equalization matrix based on the prediction error;

wherein at least one of the preceding actions is performed on at least one electronic hardware component.

2. The method of claim 1 wherein forming an equalization matrix based on the prediction error includes performing, based on the prediction error, rank-1 updates to the equalizer matrix to update the equalizer without direct matrix inversion.

3. The method of claim 1 wherein determining a channel estimation includes updating a channel estimate stepwise over a window of adaptable size.

4. The method of claim 3 wherein a size of the window of adaptable size is determined based on at least one of:
an error vector from a previous channel estimation;
channel frequency selectivity estimates;
channel time coherency estimates;
computational resources available to the receiver; and
scheduling information for another user in a multi user system.

5. The method of claim 3 wherein updating a channel estimate stepwise includes determining a step size based on at least one of a per carrier step size and a per set of carriers step size.

6. The method of claim 3 wherein a size of the window of adaptable size is changed over a single multicarrier symbol.

7. The method of claim 3 wherein different window sizes are used for channel estimation and equalization.

8. The method of claim 1 wherein determining a channel estimation includes employing at least one of a recursive least square (RLS) technique, a least mean square (LMS) technique, and a Kalman filter (KF) based frequency domain channel estimation.

9. The method of claim 1 wherein forming an equalization matrix includes at least one of employing a minimum mean square error (MMSE) technique, a zero forcing (ZF) technique, interference rejection combining (IRC) technique, and sample matrix inversion (SMI) technique.

10. The method of claim 1 comprising:
performing a second prediction error based on channel estimates for a subset of all received data streams; and
forming, based on the second prediction error, an equalization matrix that includes at least one of employing a MMSE technique, a ZF technique, an IRC technique, and an SMI technique.

11. The method of claim 1 wherein the multicarrier system is one of a long term evolution (LTE), code division multiple access (CDMA), wideband CDMA (WCDMA), frequency-division duplexing (FDD), time-division duplexing (TDD), Wi-Fi, and WiMAX system.

12. The method of claim 1 wherein the multicarrier system is one of a multi-antenna system and a multi-user single antenna system.

13. A system for adaptive channel estimation and equalization in a multicarrier communication system, the system comprising:
means for determining a channel estimation in a multicarrier communication system;
means for determining a prediction error based on a difference between the channel estimation and a reference signal; and
means for forming an equalization matrix based on the prediction error.

14. A system for adaptive channel estimation and equalization in a multicarrier communication system, the system comprising:
at least one processor and memory configured to provide an execution environment for hosting components including:
a channel estimation component configured for determining a channel estimation in a multicarrier communication system;
a prediction error component configured for determining a prediction error based on a difference between the channel estimation and a reference signal; and
an equalization component configured for forming an equalization matrix based on the prediction error.

15. The system of claim 14 wherein the equalization component is configured to form an equalization matrix based on the prediction error by performing, based on the prediction error, rank-1 updates to the equalizer matrix to update the equalizer without direct matrix inversion.

16. The system of claim 14 wherein the channel estimation component is configured to determine a channel estimation by updating a channel estimate stepwise over a window of adaptable size.

17. The system of claim 16 wherein a size of the window of adaptable size is determined based on at least one of:
an error vector from a previous channel estimation;
channel frequency selectivity estimates;
channel time coherency estimates;
computational resources available to the receiver; and
scheduling information for another user in a multi user system.

18. The system of claim 16 wherein the channel estimation component is configured to update a channel estimate stepwise by determining a step size based on at least one of a per carrier step size and a per set of carriers step size.

19. The system of claim 16 wherein the channel estimation component is configured to change a size of the window of adaptable size over a single multicarrier symbol.

20. The system of claim 16 wherein different window sizes are used for channel estimation and equalization.

21. The system of claim 14 wherein the channel estimation component is configured to determine a channel estimation by employing at least one of an RLS technique, an LMS technique, and a KF based frequency domain channel estimation.

22. The system of claim 14 wherein the equalization component is configured to form an equalization matrix by at least one of employing an MMSE technique, a ZF technique, an IRC technique, and an SMI technique.

23. The system of claim 14 wherein:
the prediction error component is configured to perform a second prediction error based on channel estimates for a subset of all received data streams; and
forming, based on the second prediction error, an equalization matrix that by at least one of employing an MMSE technique, a ZF technique, an IRC technique, and an SMI technique.

24. The system of claim 14 wherein the multicarrier system is one of an LTE, CDMA, WCDMA, FDD, TDD, Wi-Fi, and WiMAX system.

25. The system of claim 14 wherein the multicarrier system is one of a multi-antenna system and a multi-user single antenna system.

26. A non-transitory computer readable medium storing a computer program, executable by a machine, for adaptive channel estimation and equalization in a multicarrier communication system, the computer program comprising executable instructions for:
- determining a channel estimation in a multicarrier communication system;
- determining a prediction error based on a difference between the channel estimation and a reference signal; and
- forming an equalization matrix based on the prediction error.

\* \* \* \* \*